US006394716B1

(12) United States Patent
Huber et al.

(10) Patent No.: US 6,394,716 B1
(45) Date of Patent: May 28, 2002

(54) PROCESS AND MACHINE FOR FINE MACHINING OF TOOTH FLANKS OF GEARED WORKPIECES

(75) Inventors: Manfred Huber; Johannes Becker, both of Munich (DE)

(73) Assignee: The Gleason Works, Rochester, NY (US)

( * ) Notice: Subject to any disclaimer, the term of this patent is extended or adjusted under 35 U.S.C. 154(b) by 0 days.

(21) Appl. No.: 09/548,146

(22) Filed: Apr. 13, 2000

(30) Foreign Application Priority Data

Apr. 13, 1999 (DE) .......................................... 299 06 545
May 3, 1999 (DE) .......................................... 199 20 323

(51) Int. Cl.$^7$ .............................................. B23F 19/06
(52) U.S. Cl. .............................. 409/26; 409/5; 409/28; 409/34
(58) Field of Search ..................... 409/5, 12, 15, 409/31, 32, 33, 34, 6, 7, 26, 27, 28, 51

(56) References Cited

U.S. PATENT DOCUMENTS

| 2,474,209 A | * | 6/1949 | Williamson | .................. 409/34 |
| 2,585,271 A | * | 2/1952 | Praeg | ............................ 409/6 |
| 2,585,272 A | * | 2/1952 | Praeg | ............................ 409/6 |
| 3,971,293 A | * | 7/1976 | Hunkleler | ....................... 409/5 |
| 4,559,744 A | * | 12/1985 | Wirz | ............................ 409/49 |
| 4,664,569 A | * | 5/1987 | Kotthaus | ....................... 409/28 |
| 4,712,048 A | * | 12/1987 | Rebsamen | .................. 409/15 |
| 4,799,337 A | | 1/1989 | Kotthaus | |
| 4,947,590 A | * | 8/1990 | Schapp et al. | ................ 409/33 |
| 4,950,112 A | | 8/1990 | Huber | |
| 5,443,338 A | | 8/1995 | Huber et al. | |

FOREIGN PATENT DOCUMENTS

| DE | 2711282 | | 9/1978 | |
| EP | 0229894 | | 7/1987 | |
| EP | 0360953 | | 9/1993 | |
| GB | 1565035 | | 4/1980 | |
| GB | 2282394 | | 2/1995 | |
| JP | 85823 A | * | 5/1985 | ................. 409/34 |

* cited by examiner

Primary Examiner—Daniel W. Howell
(74) Attorney, Agent, or Firm—Robert L. McDowell

(57) ABSTRACT

A process and a machine for fine machining of the tooth flanks of geared workpieces with a driven tool in the form of a gear wheel or worm gear which is in meshing contact with a workpiece, the axes of tool and workpiece intersecting. During machining of the workpiece the tool is driven in a direction of rotation which remains the same and adjustable torque values are applied to the workpiece in one direction and subsequently in the opposite direction.

13 Claims, 5 Drawing Sheets

PROCESS AND MACHINE FOR FINE MACHINING OF TOOTH FLANKS OF GEARED WORKPIECES

FIELD OF THE INVENTION

The invention relates to a process and machine for fine machining of geared workpieces with a driven toothed wheel or worm-thread tool which is meshing contact with a workpiece, the axes of tool and workpiece intersecting.

BACKGROUND OF THE INVENTION

A machine of this type has been described in U.S. Pat. No. 4,950,112 to Huber. In this state-of-art machine there are mounted on the bench two tailstocks which receive between them a geared workpiece to be machined in such a way that this workpiece is rotatable about a horizontal axis. This state-of-the-art machine operates in the so-called free-running process, that is, the tool drives the workpiece in free running by way of tooth contact between tool and workpiece. Various state-of-the-art shaving processes determined by the equipment of the machine, such as plunge shaving, parallel shaving, diagonal shaving, or underpass shaving, are possible. The machining process is interrupted for workpiece replacement, that is, the tool and the workpiece come to a standstill, the chucking equipment is released, the machined workpiece is removed, and a non-machined workpiece is mounted (tooth engagement), the chuck is tightened, and the workpiece is set in motion by the tool.

Machining begins, after mounting of the workpiece in the stationary tool, with acceleration of the tool to operating speed and ends with braking of tool and workpiece before removal of the latter. The direction of rotation must be reversed during machining to prevent uneven machining of the tooth flanks which otherwise results from the forces of inertia and friction which exert their effect. In addition, the surface of the tooth flanks may be affected in this manner. Additional pauses are integrated into the machining process for these reasons. Up to the present the process has been conducted with constant, freely selected tool feed rates and at constant operating speeds (except for the acceleration and braking processes), it being possible to assign several different values within the machining process. After the assigned speed has been reached, the workpiece is moved to a clearly defined axial spacing position by rapid feed motion. Additional feed motion between tool and workpiece during machining is then effected in one or more selected feed steps. At a selected axial spacing position the advance may first be stopped but machining at rated speed may be continued for the duration of a first shaving period (pause before reversal). The tool is then slowed down, its direction of rotation is changed, and it is again accelerated to its preselected speed of rotation. After this speed has been reached, repositioning to the assigned axial spacing is made. In this so-called zero position a new shaving period (pause in zero position) is introduced. This is followed by a brief backstroke (so-called Wich period) which has the effect of smoothing the individual flank surface. The choice of the individual advance values, speeds, direction of rotation, and shaving period constitute the only potential influence on the result of shaving within the process. After the Wich period the tool is braked to a standstill and the workpiece is disengaged. After the machined workpiece is removed and a new workpiece is placed in position, the machining process described above is restarted.

It is an object of the present invention to improve the generic machining process with respect to productivity and quality.

SUMMARY OF THE INVENTION

The object of the present invention is attained in that the tool is driven in a direction which remains the same during machining of the workpiece, and in that adjustable torque values are imparted to the workpiece in one direction and then in the opposite direction. The torque values imparted to the workpiece, which are optional with respect to magnitude and direction, make it possible to simulate the forces of inertia and friction previously modified by reversal of the direction of rotation of the driven tool and to save the time taken up by this component.

Additional time can be saved by accelerating the workpiece to operating speed and bringing it into contact with the rotating tools. Doing so eliminates the previous time components required for acceleration and deceleration of workpiece and tool while in contact. Consequently, the tool may rotate without interruption.

The torque values imparted to the workpiece may also be used specifically to affect machining of the workpiece and to improve the results of machining. Pitch and runout of the workpiece, for example, may be affected by imparting a particular torque value to the workpiece. This has not previously been possible in gear wheel shaving with a free running workpiece.

The invention also is directed to a machine for application of the inventive process. The machine comprising a bench, a first slide which is mounted on the bench so as to be movable and which may be driven in movement along a first axis X, a second slide which is mounted on the first slide so as to be movable and may be driven in movement along a second axis Z at a right angle to the first axis X, a tool head which is pivotably connected to the second slide and which is pivotable about a third axis A parallel to the first axis X for adjustment of the angle of intersection between tool and workpiece, a motor mounted on the tool head for powering a tool spindle, and a tool spindle with chucking equipment for clamping a workpiece.

A preferred embodiment of the invention is described in detail below with reference to the attached drawings.

DETAILED DESCRIPTION OF THE PREFERRED EMBODIMENT

Figure 1:
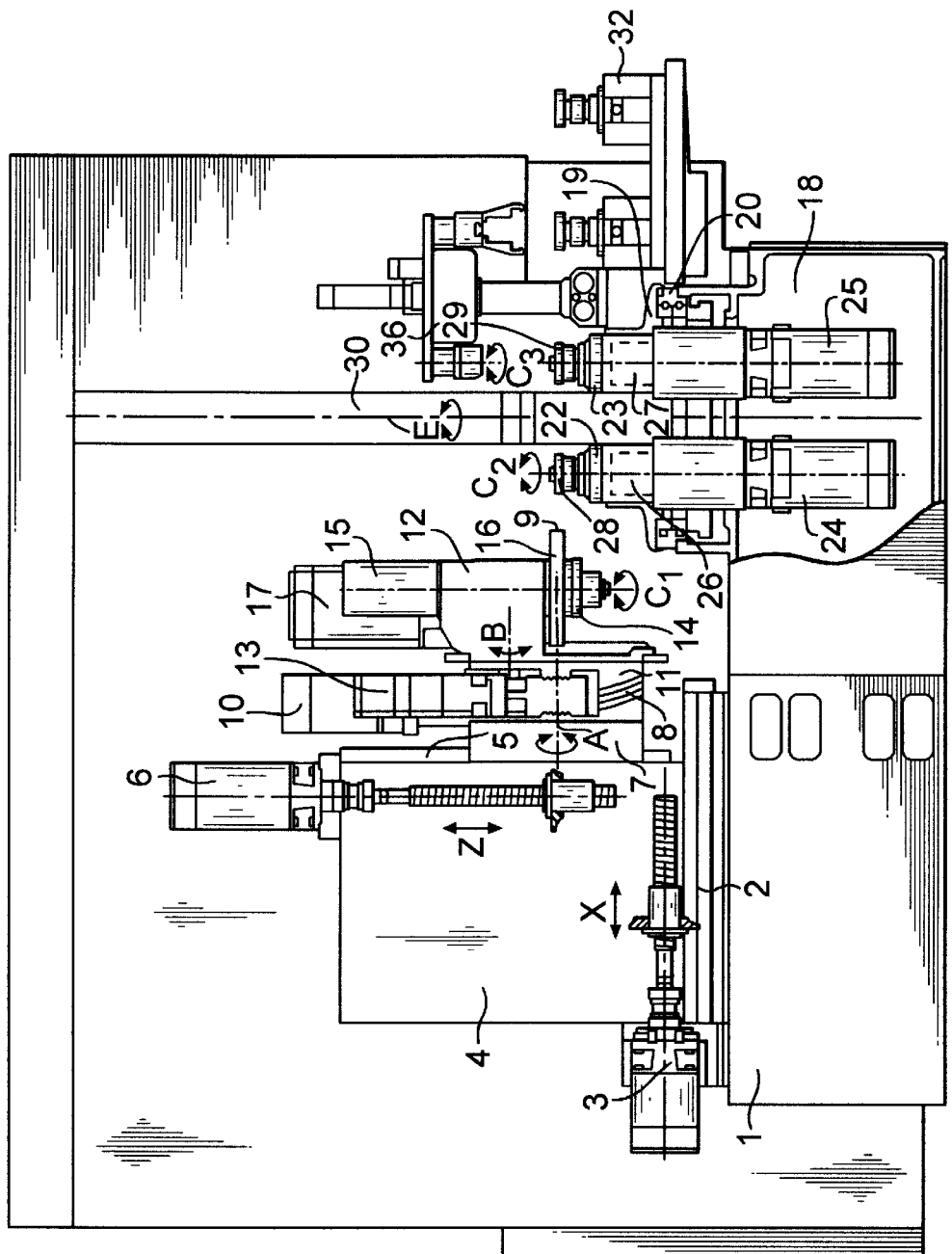
FIG. 1 shows a side view of a machine for fine machining of the tooth flanks of geared workpieces with an externally geared tool.

The machine illustrated in the drawings is used for fine machining of tooth flanks of geared workpieces with an externally geared tool. Fine machining of a gearwheel workpiece is to be understood to mean shaving, honing, continuous grinding, and fine finishing. Such machining can be carried out with one or two flanks in meshing contact.

The machine shown in FIG. 1 has a bench 1 with a horizontal guide 2 and a drive motor 3 for displacement of a horizontal slide 4 along a first axis X. The horizontal slide 4 in turn has a vertical guide 5 and a drive motor 6 for displacement of a vertical slide 7 in direction Z.

Integrated into the vertical slide 7 is a circular guide 8 whose center 9 is situated on the operating pitch diameter of a tool. The guide 8 is employed for pivoted mounting of a cradle slide 11 about a horizontal axis B. There is mounted on the vertical slide 7 a drive motor 10 for pivoting the cradle slide 11 for adjustment of the taper of the gearing about the axis B. A tool head 12 is pivot-connected to the cradle slide 11. The tool head 12 may be pivoted by a motor 13 about a horizontal axis A parallel to direction X. Such pivoting of the tool head 12 serves the purpose of adjustment of the axis intersection angle between the tool and the workpiece. A tool spindle 14 is rotatably mounted in the tool head 12 for rotation about an axis $C_1$. The tool spindle 14 is provided with rotating chucking equipment 15 for semiautomatic clamping of a gear-like tool 16. A drive motor 17 for driving the tool spindle 14 about axis $C_1$ is mounted on the tool head 12. The tool 16 may be a shaving cutter, a rolling die, a hard finishing cutter coated with CBN or diamond granules, a dressable tool such as a honing cutter or fine finishing wheel, but may also be a worm gear tool.

The partial structure of the machine as described above is essentially disclosed in previously discussed U.S. Pat. No. 4,950,112, although the axis of rotation of the tool spindle of this state-of-the-art machine is mounted in a horizontal plane.

A second bench 18 is rigidly connected to bench 1, by means of screws, for example. Mounted on the second bench 18 is an index table 19 with a collar 20 for rotation about a vertical axis E. A motor 21 which is connected to the index table 19 by intermediate gearing is mounted on the bench 18. Precise positioning of the index table relative to the bench 18 is effected by means of an index 31.

Two workpiece spindles 22 and 23 with vertical axes $C_2$ and $C_3$ are mounted on the index table 19. Drive motors 24 and 25 are associated with the workpiece spindles 22 and 23 respectively. The workpiece spindles 22 and 23 are also provided with rotating chucking equipment 26 and 27. Power to the drive motors 24 and 25 and to chucking equipment 26 and 27 is supplied by way of a power supply column 30 mounted concentrically to the axis E of the index table 19.

Figure 4:
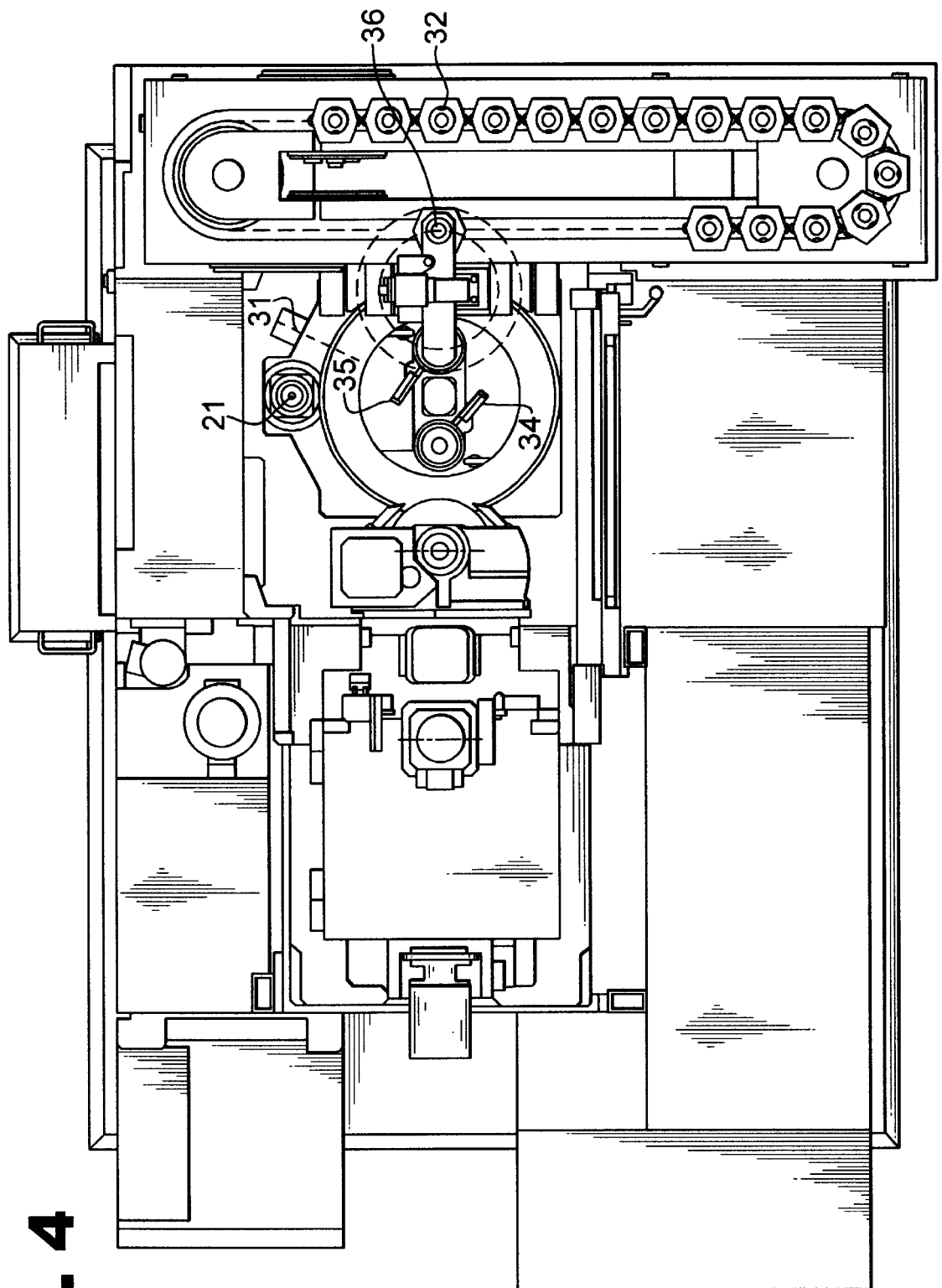
FIG. 4 a top view of the machine shown in FIG. 1.

As may be seen from FIG. 4, a magazine 32 for non-machined or machined workpieces 28, 29 is mounted beside the index table 19. A double gripper system 36 provides for automated transfer of workpieces 28, 29 between the magazine 32 and the workpiece spindles 22 and 23. The double gripper system 36 comprises a swivel arm which is rotatable about a central axis parallel to axis of rotation E of the index table 19 and is provided with a gripper on each of its opposite ends. A drive motor (not shown) is associated with the swivel arm.

A sensor 34, 35 for determination of the angular position of the teeth of the workpiece 28, 29 mounted on the index table 19 relative to the axis $C_2$ or $C_3$ of the workpiece is associated with the workpiece spindles 22, 23 mounted on the index table 19. In conjunction with the electronic positive coupling of the workpiece spindles 22, 23 with the tool spindle 14, these sensors 34, 35 permit automatic engagement of the workpiece 28, 29 with the tool 16 when the index table 19 is rotated to the machining position.

During machining or also for automatic engagement of tool 16 and workpiece 28 or 29, the motor involved, 24 or 25, is speed-synchronized with the drive motor 17 of the tool spindle 14, the transmission ratio corresponding to the ratio of the number of teeth of the workpiece to those of the tool. Different torque values may be assigned to the particular workpiece 28 or 29 to be machined by drive motors 24 or 25. The workpiece may accordingly be accelerated or decelerated relative to the tool. Consequently, change in the direction of rotation of the tool may be simulated. The change in the direction of the tool required with conventional machines for fine machining of gear wheels may thus be dispensed with.

Figure 3:
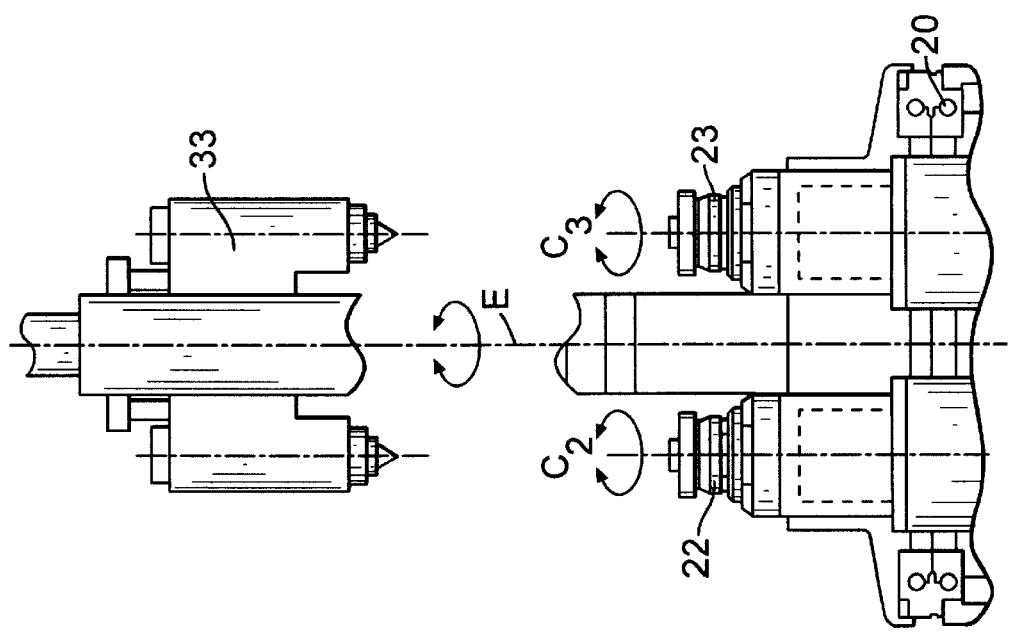
FIG. 3 a view of an index table provided with tailstock centers.
Figure 2:
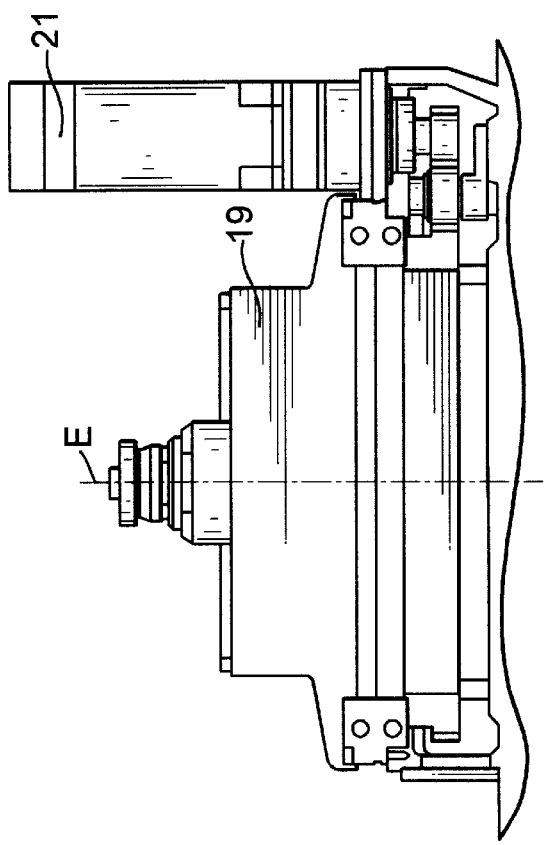
FIG. 2 a view of the index table in FIG. 1.

As is illustrated in FIG. 3, two tailstock centers 33 may additionally be mounted on the index table 19 for fixing the position of corrugated workpieces.

Although in the embodiment illustrated in the drawings and described in the foregoing the index table 19 may be rotated ±180 degrees from a transfer position to a machining position, it is theoretically possible to assign one or more machining positions to the index table. Pre-machining and/or post-machining, such as deburring, of the workpieces may be carried out in these additional machining positions. But it is also possible to effect different fine machining of workpieces in two machining positions. Different fine machining positions may be combined, for example.

The embodiment shown in the drawings may be modified by simple means so that internally geared tools may be used. All that need be done for this purpose is to modify the tool head appropriately.

In order to expand the feasible machining processes it is also possible to provide an additional movement at a right angle to the plane formed by axes X and Z.

Figure 5A:
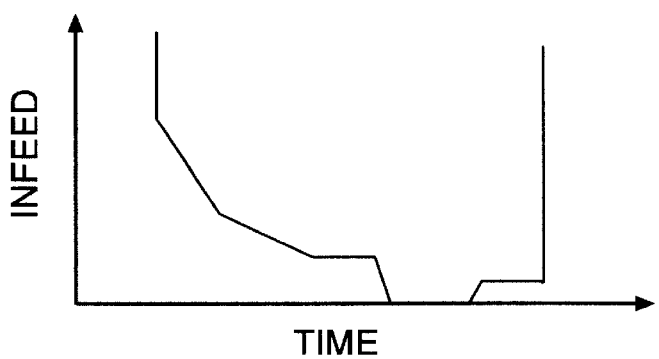
FIGS. 5a, 5b and 5c and 6a, 6b and 6c illustrate operation of the inventive machine with respect to infeed, tool speed and workpiece torque.
Figure 5B:
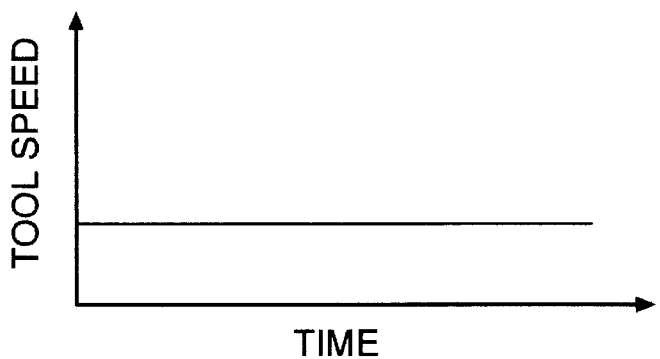
Figure 5C:
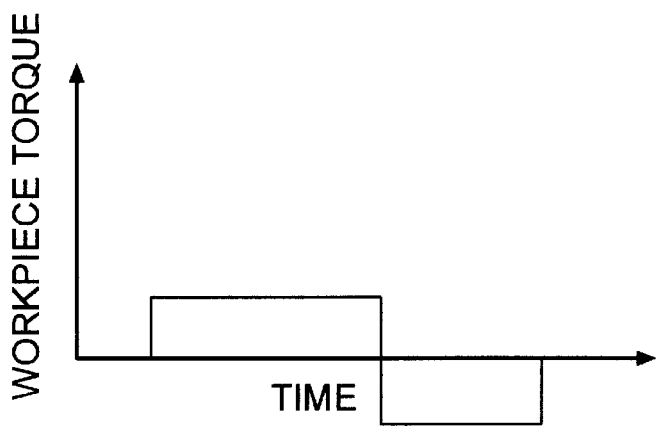
Figure 6A:
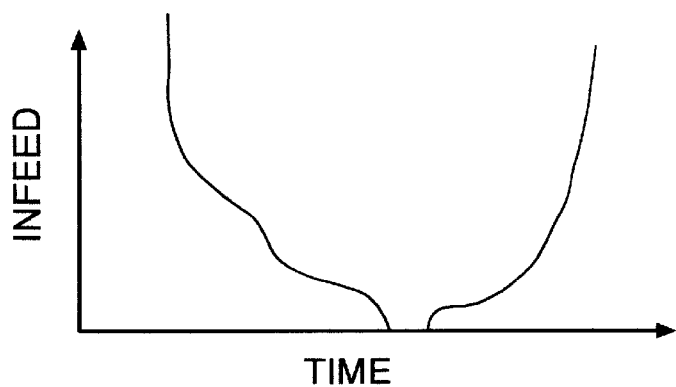
Figure 6B:
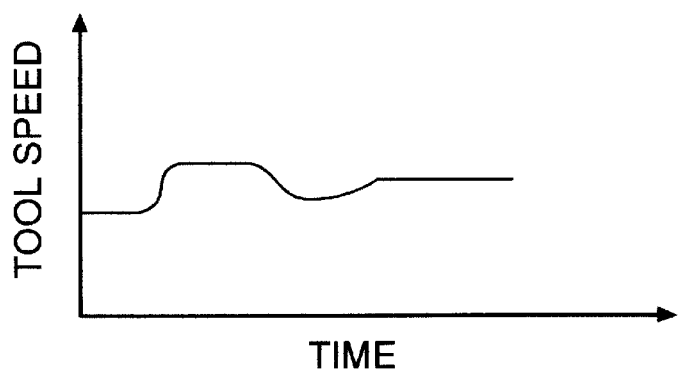
Figure 6C:
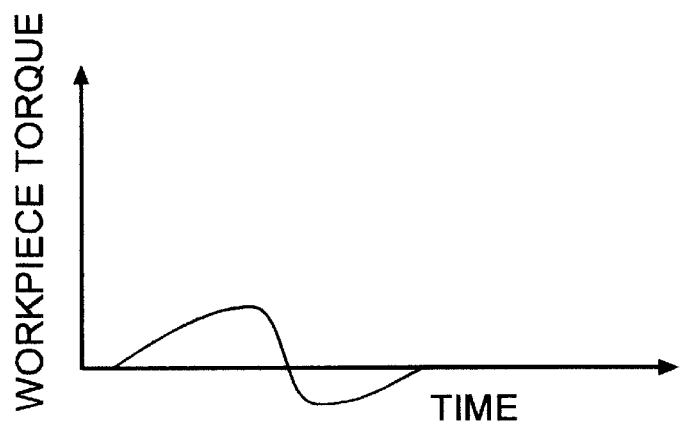

FIGS. 5 and 6 present diagrams illustrating two machining options, for example, for shaving a toothed workpiece with a geared tool. FIGS. 5a and 6a illustrate the infeed of the tool, FIGS. 5b and 6b the speed of the tool, and FIGS. 5c and 6c the torque applied to the workpiece.

As is to be seen in FIG. 5b, the speed of the tool is constant over the entire machining period. A constant positive torque is initially applied to the workpiece. As FIG. 5c shows, after the conventional pause the reversal of the direction of rotation of the tool required in the state of the art is replaced by reversal of the direction of action of the torque applied to the workpiece. In order to offset the quality effects deriving from the conditions of contact of driving and driven tooth flank, or to improve the accuracy of division, it is also possible to vary the magnitude of the torque applied to the workpiece during machining.

Another improvement in the machining process can be achieved by modifying the infeed strategy and/or the speed. As is shown in FIG. 6, use may be made for this purpose of process-directed control of the infeed in which the amount of infeed is controlled on the basis of a command variable established in the process. Registration of one or more process parameters such as the reaction forces or the vibrations occurring during machining, for example, is suitable for this purpose. By means of an adaptive feed strategy such as this the duration of the process can be further reduced, the result of machining can be improved, and tool life can be extended, since the process can be conducted as calculated under constant favorable machining conditions.

A development of the inventive process provides that the value of the torque imparted to, the speed of rotation of, and the infeed of a workpiece during machining of a workpiece may be controlled on the basis of a command variable. This makes it possible to conduct the machining process under unvarying optimum conditions, especially in gear wheel shaving. This may result in reduction of the machining time, improvement in the result, and/or extension of the life of the tool.

For example, the reaction forces or moments as measured on the tool or workpiece side may be employed as the command variable. Advance, operating speed, and torque may in this instance be controlled in such a way that the machining takes place with machining forces and conditions remaining the same.

It is also possible, however, to employ the vibrations measured on the tool or workpiece side as the command variable. Dynamically unfavorable machining process areas may be avoided in this way. In addition, the time of commencement of machining may be determined after rapid infeed on the basis of the vibrations. Vibrations also permit recognition of the state of wear of the tool.

Rotary deviations measured on the tool or workpiece side may also be used as command variable. This makes it possible to record deviations in gearing on the basis of preliminary machining and to influence such deviations specifically. Negative effects during machining caused by unfavorable tooth engagement relationships (contact ratio) may also be mitigated. These rotary deviations between workpiece and tool in meshing contact can be offset by electronic gearing.

The design of the machine claimed for the invention makes it possible, during machining of a workpiece on one workpiece spindle, to carry out unloading and loading operations simultaneously on the second workpiece spindle, and additionally, at the same time, to find the tooth/tooth gap position required for engaging the workpiece and tool. Hence, it is possible to bring the workpiece and tool into a meshing contact while in motion at operating speeds. Consequently, only rotation of the index table between the machining and the replacement position and radial infeed of the first slide occupy the auxiliary time of the machine. The motors associated with the workpiece spindles also create the possibility of introducing measures which affect the result of machining. Such measures may be applied to offset effects on quality resulting from engagement conditions between driving and driven workpiece flank. At the same time, the accuracy of pitch can be improved and the previously customary and time-consuming change in the direction of rotation may be eliminated. This is made possible by driving the workpiece to accelerate or decelerate it in relation to the tool. The speed and/or the torque of the drive motors of the tool spindle and of the workpiece spindles may be adjusted in both directions of rotation for this purpose.

The index table may be equipped with mobile tailstock centers for corrugated workpieces which are to be machined.

For the sake of additional improvement in the productivity of a machine provision is made such that a magazine for delivery and removal of non-machined and machined workpieces is mounted in the area of the index table.

An automated version of the machine is characterized by a gripper system for transfer of non-machined/machined workpieces between the magazine and the workpiece spindles. This gripper system may include a swivel arm which is rotatable about a central axis parallel to the axis of rotation E of the index table and is provided with a gripper on each of its two opposite ends.

One or more additional machining stations in which or at which workpiece spindles for further machining of workpieces may be positioned may be associated with the index table. Such further machining may involve pre-machining or post-machining of workpieces, but it is also possible to combine two different types of fine machining.

It is expedient for power for driving the motors and chucking equipment associated with the workpiece spindles to be supplied by way of a power supply column mounted concentrically to the axis of rotation of the index table.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A process for fine machining of the tooth flanks of geared workpieces with a driven tool in the form of a gearwheel or worm gear which is in meshing contact with a workpiece, the axes of tool and workpiece intersecting, said process including the steps of:
    driving said tool in a direction of rotation which remains the same during machining of the workpiece, and,
    applying adjustable torque values to the workpiece in one direction and then in the opposite direction.

2. The process of claim 1, further including the steps of:
    accelerating said workpiece to an operating speed, and,
    bringing said workpiece into meshing contact with the rotating tool.

3. The process of claim 1 further including the steps of:
    controlling the magnitude of the torque applied to the workpiece during the machining of this workpiece, the tool speed, and the tool infeed on the basis of a command variable established by one or more process parameters.

4. The process of claim 3 further including:
    measuring the reaction forces or moments on the tool or workpiece, and,
    employing said measured reaction forces or moments as the command variable.

5. The process of claim 3 further including:
    measuring vibrations on the tool or workpiece, and,
    employing said measured vibrations as the command variable.

6. The process of claim 3, further including
    measuring the angular deviation on the tool or workpiece, and,
    employing said measured angular deviation as the command variable.

7. A machine for fine machining of tooth flanks of geared workpieces with a tool in the form of a gearwheel or worm gear which is in meshing contact with a workpiece, said machine comprising:
    a bench,
    a first slide movably mounted on the bench, which slide may be driven in movement along a first axis X,
    a second slide movably mounted on the first slide, which second slide may be driven in movement along a second axis Z at a right angle to the first axis X,
    a tool head rotatably connected to the second slide, which tool head may be pivoted about a third axis A parallel to the first axis X for adjustment of the axis intersection angle between tool and workpiece,
    a motor mounted on the tool head for driving a tool spindle, and,
    a workpiece spindle, with chucking equipment for clamping a workpiece, characterized in that:
        an index table is rotatably connected to a bench for rotation about an axis E parallel to the second axis Z, said index table being driven by a motor in rotary movement about specific angles of rotation,
        at least two workpiece spindles being mounted on the index table, the axes of rotation $C_2$, $C_3$ of said spindles being parallel to the axis E and spaced the same distance from said E axis, an index which blocks the index table from rotation in the machining stage, each of the workpiece spindles is connected to a drive motor and each workpiece spindle includes a sensor therewith for establishment of an angular position of the teeth of the workpiece relative to the axis $C_2$, $C_3$ of the workpiece, the drive motors of the tool spindle and of the workpiece spindles are coupled by electronic gearing which rotates tool and workpiece relative to each other on the basis of a signal from the sensor so that the teeth of the workpiece will be located in a correct meshing position respectively to the tool.

8. The machine of claim 7 wherein at least one of the speed and the torque of the drive motors of the tool spindle and of the workpiece spindles are controllable in both directions of rotation.

9. The machine of claim 7 wherein the index table includes movable tailstock centers.

10. The machine of claim 7 wherein a magazine for machined and non-machined workpieces is provided in the area of the index table.

11. The machine as described in claim 10 further including a gripper system for transfer of non-machined/machined workpieces between the magazine and the workpiece spindles.

12. The machine of claim 11 wherein the gripper system comprises a swivel arm which is rotatable about a central axis parallel to the axis of rotation E of the index table and which is outfitted with a gripper at opposite ends.

13. The machine of claim 7 further including a power supply column mounted concentrically to the axis of rotation E of the index table.

* * * * *